(12) United States Patent
De Bono et al.

(10) Patent No.: US 8,295,997 B2
(45) Date of Patent: Oct. 23, 2012

(54) METHOD OF DETERMINING AND DISPLAYING FLYING INDICATIONS AND A FLIGHT INDICATOR FOR IMPLEMENTING SAID METHOD

(75) Inventors: Karine De Bono, Marseille (FR); Michel Godard, Lambesc (FR)

(73) Assignee: Eurocopter, Marignane Cedex (FR)

( * ) Notice: Subject to any disclaimer, the term of this patent is extended or adjusted under 35 U.S.C. 154(b) by 449 days.

(21) Appl. No.: 12/721,592

(22) Filed: Mar. 11, 2010

(65) Prior Publication Data

US 2010/0235019 A1 Sep. 16, 2010

(30) Foreign Application Priority Data

Mar. 12, 2009 (FR) ...................................... 09 01137

(51) Int. Cl.
*B64D 43/00* (2006.01)
(52) U.S. Cl. ................ 701/14; 701/3; 340/946; 340/967
(58) Field of Classification Search ................ 701/3–10, 701/14; 340/946, 963, 967, 971, 974–978; 73/178 H
See application file for complete search history.

(56) References Cited

U.S. PATENT DOCUMENTS

| 5,915,273 | A | 6/1999 | Germanetti | |
|---|---|---|---|---|
| 7,414,544 | B2* | 8/2008 | Oltheten et al. ............... | 340/946 |
| 2001/0044679 | A1 | 11/2001 | Permanne | |
| 2002/0030610 | A1* | 3/2002 | Ishihara et al. ............... | 340/970 |
| 2003/0071828 | A1* | 4/2003 | Wilkins et al. ................. | 345/619 |
| 2005/0042094 | A1* | 2/2005 | Occhiato et al. ................ | 416/61 |
| 2006/0287778 | A1* | 12/2006 | Oltheten et al. ................... | 701/1 |
| 2008/0140268 | A1* | 6/2008 | Todini ............................... | 701/3 |
| 2009/0138142 | A1* | 5/2009 | Still et al. .......................... | 701/4 |
| 2009/0306839 | A1* | 12/2009 | Youngquist et al. ............ | 701/14 |
| 2010/0222993 | A1* | 9/2010 | Brainard et al. .............. | 701/124 |

FOREIGN PATENT DOCUMENTS

| EP | 0 816 226 | 1/1998 |
|---|---|---|
| WO | 2006/081334 | 8/2006 |

OTHER PUBLICATIONS

French Search Report dated Oct. 20, 2009, from corresponding French application.

* cited by examiner

*Primary Examiner* — Khoi Tran
*Assistant Examiner* — Jason Holloway
(74) *Attorney, Agent, or Firm* — Brooks Kushman P.C.

(57) ABSTRACT

The present invention relates to a pilot assistance method for giving assistance in piloting a rotary wing aircraft, the method consisting in using a scale with collective pitch graduations that is movable on a display screen to indicate the position of the collective pitch, in determining the desynchronization pitch, in using a maximum limit value and a minimum limit value for the speed of rotation of the rotor, in transforming the maximum limit value and the minimum limit value in real time and as a function of physical flight parameters respectively into a bottom limit position and a top limit position for the collective pitch, and when a determined difference appears between the real value and the reference value Nr0 for the speed of rotation of the rotor, in displaying at least one item of corrective information about the adjustment of the collective pitch.

20 Claims, 3 Drawing Sheets

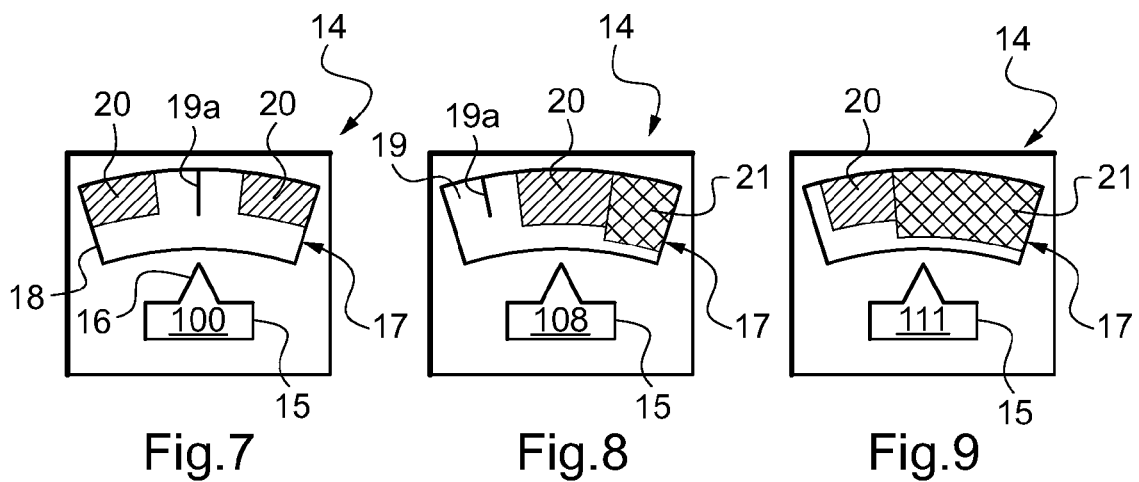
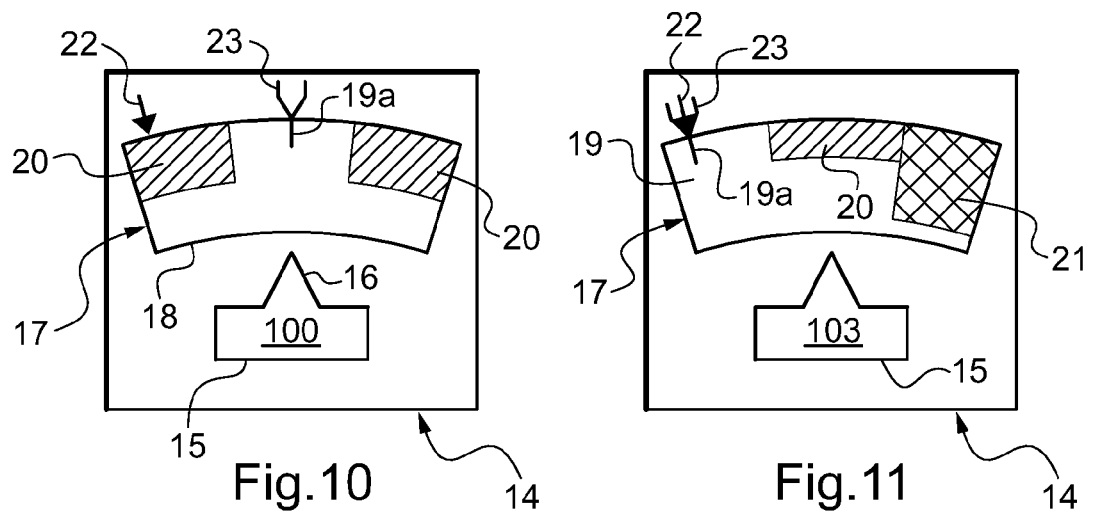

METHOD OF DETERMINING AND DISPLAYING FLYING INDICATIONS AND A FLIGHT INDICATOR FOR IMPLEMENTING SAID METHOD

FIELD OF THE INVENTION

The present invention relates to the general technical field of piloting a rotary wing aircraft, and in particular to the general technical field of flight instruments. These instruments are used by the pilot to monitor environmental and technical parameters associated with the flight. These instruments enable the pilot firstly to be informed about any malfunction of equipment, such as engines or other pieces of equipment of the aircraft, and secondly to give said pilot assistance in the various stages of piloting said aircraft.

For example, when piloting a helicopter, it is necessary to monitor numerous instruments on an instrument panel, most of which instruments are representative of the operation of the engine unit and of other pieces of equipment of the aircraft. For physical reasons, there are numerous limitations that the pilot needs to take into consideration at each instant during a flight. These limitations depend in general on the state of the flight and on external conditions.

BACKGROUND OF THE INVENTION

Most presently-constructed helicopters are fitted with one or more turbine engines, referred to as a turbine engine power plant, generally using a free turbine. A speed-reducing gearbox, also referred to as a main transmission gearbox (MGB) serves to make the driving connection between the engine unit and the rotary wing, specifically the rotor driving the blades.

By way of example, patent EP 0 816 226 discloses a flight indicator for an aircraft that is designed to show the power margin available on at least one engine of the aircraft as a function of flying conditions. The indicator uses signals from sensors suitable for delivering information concerning various monitoring parameters of the engine, processor means for processing the information coming from said sensors, and display means that present the processed information on a display screen, which information relates to that one of the parameters, from amongst said plurality of engine monitoring parameters, for which the current value is the closest to a defined limit value for said parameter. The limit values are established in real time while taking account of ambient pressure and temperature.

The above-mentioned flight indicator thus identifies, in relative values, that one of the essential engine monitoring parameters that is closest to its limit. The information relating to the limit to be complied with is then grouped together in a single display serving firstly to summarize the information and to present the pilot solely with the result of this summary, thereby simplifying the pilot's task, and secondly to save space on the instrument panel.

The flight indicator thus includes various sensors that relate to different parameters that need to be monitored and that are suitable for delivering information corresponding to those various parameters to a computer that processes said information. Display means then present on a display screen information that relates to a so-called "limit" parameter selected from amongst said engine monitoring parameters as being the parameter for which the current value is the closest to the corresponding limit value. Such a flight indicator is referred to as a first-limit indicator or FLI for short.

In the specific example of a rotary wing aircraft, e.g. a helicopter, having at least one turbine engine and at least one rotor, the particular monitoring parameters are associated with said turbine engine and with the main gearbox.

Present-day flight indicators of the FLI kind are nevertheless not sufficient under certain circumstances concerning the information they show the pilot. The pilot needs also to use additional information relating to additional parameters of various kinds that are displayed separately, and then needs mentally to summarize all that information before undertaking appropriate piloting actions. This does not contribute to simplifying the pilot's task, and the pilot is often called on to take decisions extremely quickly in order to avoid endangering the crew and/or threatening the integrity of the aircraft. Amongst those additional parameters, there are parameters that are essential to piloting, such as, for example, the speed of rotation of the rotor.

The speed of rotation of the rotor needs to be monitored just as much as the monitoring parameters that are processed by the first-limit indicator. Too great a difference between the real speed of rotation of the rotor and the normal speed of rotation of the rotor, referred to as the "reference" speed of rotation, can lead to severe and irreversible consequences for the aircraft.

During certain stages of flight, when the speed of rotation of the rotor departs from the reference speed of rotation, the pilot acts on the collective pitch of the blades. Thus, when the real speed of rotation is too fast, the pilot increases the collective pitch to brake the movement of the rotor. Conversely, when the real speed of rotation of the rotor is too slow, the pilot decreases the collective pitch in order to increase said real speed of rotation of the rotor.

These piloting operations are not without danger insofar as there exist physical limits on the speed of rotation of the rotor that must under no circumstance be crossed. Thus, a maximum speed of rotation is defined for the rotor. In addition, beyond the physical limitations that are associated with the main gearbox or the rotor hub, there are stalling limits that must not be exceeded. Thus, a minimum speed of rotation is defined for the rotor at the outlet from the main gearbox. Consequently, the real speed of rotation of the rotor must remain within a range that is defined by maximum and minimum speeds of rotation.

Exceeding the maximum speed of rotation corresponds to crossing a bottom limit position for the collective pitch and to a speed of rotation of the blades that is greater than that imposed by the main gearbox. This is made possible by incorporating a free-wheel mechanism, known per se, in the main gearbox. This results in an interruption in the transmission of mechanical torque from the power plant and the main gearbox. Specifically, the pilot is then in a situation in which the speed of rotation of the rotor is no longer under control. Piloting the aircraft can then become very difficult or even impossible. The pilot is also confronted with a major risk of damage to mechanical parts and under the best of circumstances a maintenance operation will be required.

When the transmission of mechanical torque is interrupted between the power plant and the main gearbox, without exceeding the maximum speed of rotation of the rotor, the pilot is in a situation in which the collective pitch has crossed a threshold referred to as the "desynchronization" pitch. Such a situation is compatible, for example, with a stage of flight known as "autorotation" that a pilot may engage under certain circumstances, and in particular in the event of losing power from an engine. The value of the desynchronization pitch is independent of the maximum and minimum speeds of rotation of the rotor.

Crossing the minimum speed of rotation in the slowing direction corresponds to crossing a top limit for setting the collective pitch and to a speed of rotation for the blades that is slower than that imposed by the main gearbox. This results in an increased power demand on the turbine engine, which can result quite quickly in reaching an operating limit that leads to the loss of said engine. Under all circumstances, the pilot runs the risk of being confronted with insufficient or failing lift from the rotary wing.

In the particular circumstance of an aircraft having at least two turbine type engine units, failure of one of said engines can be compensated for some given duration by using the other engine. During this given duration, even if short, the above-described problem remains in full. The two turbine engines are said to be out of alignment. The pilot then has an indication displayed in the first-limit indicator that corresponds to a position for the collective pitch that is referred to as the "refuge" pitch in order to optimize use of the still-functioning engine.

Document WO 2006/081334 discloses an aircraft flight indicator for showing the power margin available on at least one aircraft engine as a function of flying conditions. The indicator described displays a plurality of parameters, and in particular a first parameter having a highest normalized value and a second parameter having a normalized value that is closest to its normalized limit (cf. FLI). Those indicators serve to inform the pilot about the speed of rotation of the rotor, the maximum and minimum values for the rotor speed, and the speed of rotation of the engine turbine. Provision is also made for piloting at a speed of rotation for the rotor that is different from the reference value.

Document US 2001/044679 also describes an aircraft flight indicator for showing the power margin available on at least one aircraft engine as a function of flying conditions. The indicator displays the parameter that is closest to its limit (FLI), and when the speed of rotation of the rotor drops below a determined limit, it informs the pilot of the correction to be made to the collective pitch.

OBJECTS AND SUMMARY OF THE INVENTION

An object of the present invention is to improve the control of an aircraft by anticipating a presentation of information necessary for the pilot to react quickly and appropriately.

An object of the present invention is to provide a novel pilot assistance method for a rotary wing aircraft that enables the pilot's task to be simplified and that improves the speed with which the pilot takes the decision to engage appropriate piloting actions.

Another object of the present invention is to provide a novel flight indicator for a rotary wing aircraft, which indicator is particularly reliable, simple, and fast for the pilot to use.

The objects given to the invention are achieved by a pilot assistance method for assisting the piloting of a rotary wing aircraft, the method consisting in using the real value Nr and the reference value Nr0 for the speed of rotation of at least one rotor and in using display means to present on a display screen a movable scale for indicating the position of the collective pitch P, the method consisting in:

using a maximum limit value Nr+ and a minimum limit value Nr− for the speed of rotation of the rotor;
determining the desynchronization pitch Pds corresponding to the position of the collective pitch P from which the transmission of mechanical torque from a turbine engine unit and a main gearbox is interrupted;
displaying the desynchronization pitch Pds on the movable scale by using a floating reference marker;
translating in real time and as a function of physical flight parameters, the maximum limit value Nr+ and the minimum limit value Nr− respectively into a bottom limit position Pinf and a top limit position Psup for the collective pitch P, said limit positions Pinf and Psup being active;
displaying the bottom and top limit positions Pinf and Psup on the movable scale;
comparing in real time the real value Nr of the speed of rotation of the rotor with the reference value Nr0 for the speed of rotation of the rotor; and
when a determined difference appears between the real value Nr and the reference value Nr0 for the speed of rotation of the rotor, displaying at least one item of corrective information on the display screen, said information being at least visual and concerning the action to be undertaken by the pilot on the adjustment of the collective pitch P.

In an implementation in accordance with the invention, the method consists in using corrective information of presentation that changes when the position of the collective pitch P approaches the bottom limit position Pinf or the top limit position Psup in order to attract the pilot's attention more strongly.

In an implementation in accordance with the invention, the method consists in combining the visual corrective information with an audible warning in the event of the real value Nr crossing the maximum limit value Nr+ or the minimum limit value Nr− for the speed of rotation of the rotor.

In an implementation in accordance with the invention, the method consists in determining the desynchronization pitch by means of an algorithm involving theoretical data and/or data measured during flight testing.

In an implementation in accordance with the invention, the method consists in using a first-limit indicator "FLI", using display means to present information on the display screen, said information relating to that one of the parameters selected from amongst the monitoring parameters of the aircraft, for which the real value is closest to the limit value defined for said parameter, and also displaying the movable scale on said display screen.

In an implementation in accordance with the invention, the method consists in using an additional dial to display a digital value in a stationary window in the vicinity of the movable scale, the digital value corresponding to a real value Nr of the speed of rotation of the rotor.

In an implementation in accordance with the invention, the method consists in associating an additional movable scale with the stationary window, which additional movable scale presents zones of different colors together with a neutral central zone including a central graduation, said zones corresponding to real values Nr of the speed of rotation of the rotor, and in moving said additional movable scale to display the colored zones including the real value Nr in register with the stationary window constituting another stationary reference marker.

In an implementation in accordance with the invention, the method consists in using as physical flight parameters, in particular measured values of temperature and altitude, speed of advance values, and/or values of other vehicle parameters of the aircraft together with vehicle parameters such as the speed of rotation of the rotor, the speed of rotation of the turbine, engine torque, MGB torque, aircraft weight, and parameters concerning the control members.

In an implementation in accordance with the invention, the method consists in using the computer of the first-limit indicator FLI to act in real time to determine the top and bottom limit positions Psup and Pinf for the collective pitch and also the desynchronization pitch Pds. These positions are determined in real time, in particular as a function of the speed of rotation of the rotor.

In an implementation in accordance with the invention, the method consists in using a computer independent of the first-limit indicator FLI to determine in real time the top and bottom limit positions Psup and Pinf of the collective pitch P and also the desynchronization pitch Pds. These positions are determined in real time, in particular as a function of the speed of rotation of the rotor.

In an implementation in accordance with the invention, the method consists in using data measured during flight testing to determine in real time the top and bottom limit positions Psup and Pinf for the collective pitch P and also the desynchronization pitch Pds.

In an implementation in accordance with the invention, when the aircraft has at least two engine units, the method consists in indicating the malfunction of one of the engine units at least visually on the additional dial in the vicinity of the additional movable scale.

The objects given to the invention are also achieved with the help of an aircraft flight indicator, the indicator including sensors suitable for delivering information relating to various monitoring parameters of the aircraft, processor means for processing said information, such as a computer, and display means for presenting information on a display screen, the indicator comprising:

- a screen that is movable relative to a stationary reference marker on the display screen, the scale indicating the position of the collective pitch P;
- additional processor means for processing in real time predetermined maximum and minimum limit values Nr+ and Nr− for the speed of rotation of the rotor respectively in the bottom and top limit positions Pinf and Psup for the collective pitch P, said limit positions Pinf and Psup being active;
- said additional processor means serving to determine the desynchronization pitch Pds corresponding to the position of the collective pitch beyond which the transmission of mechanical torque between the turbine engine unit and the main gearbox is interrupted;
- display means for displaying in real time the bottom and top limit positions Pinf and Psup together with the desynchronization pitch Pds on the movable scale;
- the additional processor means including comparator means for comparing in real time the real value Nr with the reference value Nr0 for the speed of rotation of the rotor; and
- the additional processor means also including activation means for activating the display means to display corrective information on the display screen as a function of the result of the comparison giving the difference between the real value Nr and the reference value Nr0 for the speed of rotation of the rotor, the corrective information being at least visual and concerning the action to be taken on the collective pitch stick.

In an embodiment in accordance with the invention, the processor means, the additional processor means, the display means, and the activation means are controlled by a computer of a first-limit indicator FLI.

In another embodiment in accordance with the invention, the additional processor means and the activation means are controlled by a computer distinct from the computer of a first-limit indicator FLI.

In an embodiment in accordance with the invention, the computer includes software resources for determining by calculation firstly the top and bottom limit positions Psup and Pinf for the collective pitch P, and secondly the desynchronization pitch Pds.

In an embodiment in accordance with the invention, the computer also includes memory means having stored therein predetermined data together with flight test data, said data being used in the calculations.

In an embodiment in accordance with the invention, the display screen includes two juxtaposed dials, one of the dials being used for a first-limit indicator and the other dial being used in particular to display the movable scale indicating the pitch limit positions and the desynchronization pitch.

In an embodiment in accordance with the invention, the display screen has a single dial used for a first-limit indicator and for displaying the movable scale indicating the pitch limit positions and the desynchronization pitch.

In an embodiment in accordance with the invention, the flight indicator includes an additional dial indicating: the real value Nr of the speed of rotation of the rotor in a stationary window that also constitutes another stationary reference marker; at least one item of additional visual information concerning the difference between the real value Nr and the reference value Nr0 of the speed of rotation of the rotor; and/or at least one item of information concerning the state(s) of operation of the engine unit(s).

The objects given to the invention are also achieved with the help of an improved first-limit indicator for a rotary wing aircraft, including a flight indicator in accordance with the invention.

The objects given to the invention are also achieved with the help of a rotary wing aircraft of the helicopter kind including a flight indicator in accordance with the invention.

The pilot assistance method in accordance with the invention makes it possible, in association with a flight indicator or a first-limit indicator, to use the real value of the speed of rotation together with other information relating to the speed of rotation of the rotor. The pilot thus has a flight indicator that takes account of an essential parameter that is additional to the parameters taken into account by prior instruments that only take account of said real value of the speed of rotation of the rotor.

The pilot no longer needs to look at another dial on the instrument panel concerning the speed of rotation of the rotor and/or the limits that are associated therewith in order to analyze the situation and then undertake corrective piloting action, should that be necessary.

Furthermore, the method and the indicator in accordance with the invention inform the pilot about the maneuverability margin of the aircraft. The pilot knows immediately the amplitude with which the collective pitch stick can be manipulated to avoid crossing special or critical values or to manage a particular stage of flight such as autorotation.

The pilot does not need to calculate or estimate these limits, thus making the pilot's task easier.

In known rotary wing aircraft, the pilot is generally capable only of observing a posteriori any possible increase or decrease in the speed of rotation of the rotor as a result of taking action on the collective pitch stick. The consequence of an action undertaken by the pilot may be contrary to the desired object. Under some circumstances while flying the aircraft, this can be dangerous. By means of the pilot assistance method and the flight indicator in accordance with the invention, the pilot knows in real time which limit is being approached and what action needs to be undertaken on the collective pitch adjustment stick in order to return to a normal situation, with this applying to all stages of flight, of landing, of take-off, or of autorotation. The pilot is thus continuously informed about the maneuverability margin of the aircraft.

BRIEF DESCRIPTION OF THE DRAWINGS

The invention and its advantages appear in greater detail from the context of the following description of an embodiment given by way of non-limiting illustration with reference to the accompanying figures, in which:

FIGS. 7 to 9 are detail views of the FIG. 1b flight indicator, corresponding to the operating stages shown respectively in FIGS. 2, 3, and 4; and FIGS. 10 and 11 are detailed views of the FIG. 1b flight indicator corresponding to the operating stages shown respectively in FIGS. 2 and 3 for an aircraft having two engine units.

MORE DETAILED DESCRIPTION

Elements that are structurally and functionally identical and shown in more than one of the figures are given the same numerical or alphanumeric references in each of them.

Figure 1A:
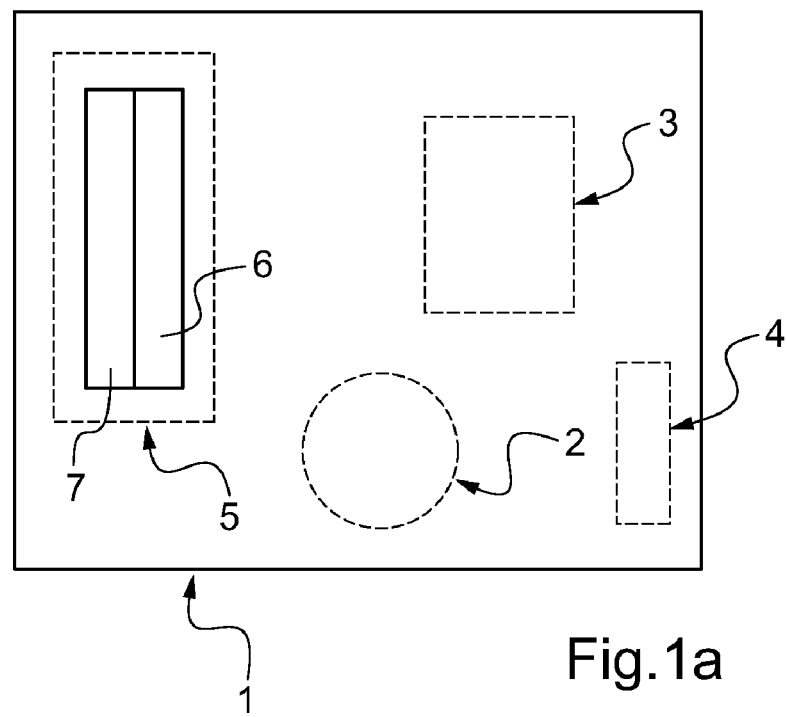
FIG. 1a is a diagram showing an example of a general screen for displaying information coming from various instruments of the aircraft, and in particular an embodiment of a flight indicator in accordance with the invention.

FIG. 1a shows an embodiment of a general screen 1 for an aircraft instrument panel including a flight indicator in accordance with the invention. The general screen 1 includes in particular various different indicators 2, 3, and 4 that are themselves known and that are used for controlling the operation of the aircraft and for navigation purposes.

The flight indicator comprises for example a first-limit indicator (FLI) associated with a display screen 5. The first-limit indicator as described briefly above is already known and is not explained in greater detail.

The display screen 5 has a first dial 6 having a movable scale 6a displayed thereon, as can be seen in FIGS. 2 to 6. The movable scale 6a has a vertical graduation representative of the positions of the collective pitch P. The movable scale 6a moves relative to a stationary reference 6b on the display screen 5 as a function of the setting of the collective pitch P, said stationary reference 6b then being in register with a graduation of the movable scale 6a that indicates the current position of the collective pitch P as controlled by the pilot.

The display screen 5 also has a zone 7 or a juxtaposed additional dial for displaying the limit parameter of the first-limit indicator FLI.

The stationary reference 6b is represented, for example, by a horizontal stationary mark, with the movable scale 6a moving vertically behind it.

The movable scale 6a also presents a movable graduation corresponding to a previously-defined refuge pitch 8, together with additional indications 10 and 11 that are not associated with the operation of the turbine engine(s) and that may also appear on the dial 6.

The movable scale 6a also presents a floating mark 9 on the movable scale 6a, which mark corresponds to a particular position of the collective pitch P, referred to as the desynchronization pitch Pds. This pitch is determined by the method in accordance with the invention.

By way of example, the desynchronization pitch $P_{ds}$ is determined using a closed-loop relationship as specified below:

$$P_{ds} = P + (K - W_m) \times \left(\frac{\Delta P}{\Delta W_m}\right) + (N_R - N_{R0}) \times \left(\frac{\Delta P}{\Delta N_R}\right) \times C$$

with C=1 if $N_R \geq N_{R0}$ and C=0 if $N_R < N_{R0}$.

In this formula, P represents the current measured position of the collective pitch, $W_m$ represents the measured value of the power transmitted by the main gearbox to the rotor, $N_R$ represents the current speed of rotation of the rotor, and $N_{R0}$ represents the reference speed of rotation of the rotor.

The term K represents linear variation of order n, where n lies in the range 1 to 4, between the current pitch P and the impact speed $V_i$ of the rotor disk. The following formula is used:

$$K = a \times P^n + b \times P^{n-1} + \ldots + c \times P^2 + d \times P + e$$

in which the coefficients a, b, c, d, and e have the following form:

$$i_1 \times V_i^2 + i_2 \times V_i + i_3$$

where $i_1$, $i_2$, and $i_3$ are constants that are determined by simulation.

The impact speed $V_i$ of the rotor disk is the mean speed of the set of rotor-blades relative to the mass of air and not relative to the ground. The impact speed of the rotor disk is established as a function of the calculated true air speed (TAS).

The term K can thus be calculated from a pre-recorded curve that is obtained by simulation, and that gives the measured variation of the impact speed of the rotor disk as a function of the variation of the current pitch P. For each aircraft of different weight, there exists one such specific curve.

The term $$\frac{\Delta P}{\Delta W_m}$$

represents the ratio between pitch variation and variation in the power transmitted to the rotor, and the term $$\frac{\Delta P}{\Delta N_R}$$

represents the variation between pitch variation and the variation in the speed of rotation of the rotor.

The term $$\frac{\Delta P}{\Delta W_m}$$

is calculated from a pre-recorded curve, obtained by simulation performed using a known model, giving the measured power variation as a function of the pitch variation. For each aircraft of different weight, there exists one specific curve.

The term $$\frac{\Delta P}{\Delta N_R}$$

is calculated from a pre-recorded curve, obtained by simulation using a known model, giving variation in the speed of rotation of the rotor as a function of pitch variation. For each aircraft of different weight, there exists one specific curve.

The shape of the various curves mentioned above may also depend on the speed of advance of the aircraft.

The three above terms may be obtained by calculation and/or simulation based on tests in flight. One solution might consist in calculating said terms and then in readjusting them in flight.

The pilot is thus informed in real time about the maneuverability margin relative to the desynchronization pitch, by looking at the graduation identified by the stationary reference mark 6b and by the floating reference mark 9.

The flight indicator in accordance with the invention also has additional processor means making use of the maximum and minimum limits Nr+ and Nr− for the speed of rotation Nr of the rotor, and translating in real time and as a function of physical flight parameters, said maximum and minimum limit values Nr+ and Nr− respectively into bottom and top limit positions Pinf and Psup for the collective pitch. The bottom limit Pinf for the collective pitch thus corresponds to a physical limit associated with mechanical strength and the top limit Psup for the collective pitch corresponds to an aerodynamic limit associated with lift.

The limit positions Pinf and Psup are active, i.e. they are not frozen relative to the movable scale 6a, but rather they move on said movable scale 6a in a manner that corresponds to variation in the physical flight parameters taken into consideration by the additional processor means. The same applies for the desynchronization pitch Pds, which under all circumstances lies between these two limits Pinf and Psup.

In order to determine the value of Psup, corresponding to Nr−, the methods known for first-limit instruments are applied and they make use of a pitch/power relationship.

In order to determine the value Pinf, corresponding to Nr+, the above-described formula is applied in which $N_{RO}$ is replaced by Nr+ and while eliminating any condition concerning $N_R$, i.e. C=1 for this purpose.

The flight indicator in accordance with the invention also includes display means for displaying in real time the bottom and top limit positions Pinf and Psup on the movable scale 6a.

The additional processor means include comparator means for acting in real time to compare the real value Nr of the speed of rotation of the rotor with the reference value Nr0 for the speed of rotation of the rotor. The complementary processor means are thus implemented using electronic and computer tools such as a computer that is operated under the control of at least one algorithm.

The additional processor means also include means for activating the display means to display on the display screen 5 corrective information as a function of the result of the comparison giving the difference between the real value Nr and the reference value Nr0 for the speed of rotation of the rotor, which corrective information is at least visual and indicates the action that it is appropriate to take on the collective pitch stick.

By way of example, the corrective information is presented in the form of a first signal 12, which may be associated under certain circumstances with a second signal 13.

In an embodiment of the flight indicator in accordance with the invention, the processor means, the additional processor means, the display means, and the activation means are controlled by a computer, e.g. of the first-limit indicator.

The computer has software resources for determining by calculation the top and bottom limit positions Psup and Pinf of the collective pitch and also the desynchronization pitch Pds.

In an embodiment of the flight indicator in accordance with the invention, the computer also has memory means serving to store data measured during flight tests and relating to physical flight and piloting parameters. This data is used in calculation in order to determine the limit positions Pinf and Psup on the basis of the maximum and minimum values Nr+ and Nr−.

By way of example, the display screen 5 has two juxtaposed dials 6 and 7, one of the dials 7, being used for the first-limit indicator and the other dial 6 being used to display the movable scale 6a for adjusting the collective pitch P.

In another embodiment, the display screen 5 has a single dial used by the first-limit indicator and to display the movable scale 6a for the collective pitch, the first signal 12, and the second signal 13.

In an embodiment, as shown in particular in FIGS. 1b, 7, 8, and 9, the flight indicator includes an additional dial 14 indicating the real value Nr of the speed of rotation of the rotor in a stationary window 15 that also constitutes another stationary reference marker 16. The real value Nr of the speed of rotation of the rotor is indicated by way of example as a percentage of the reference value Nr0, or as a number of revolutions per minute.

The additional dial 14 displays at least one additional item of visual information concerning the difference between the real value Nr and the reference value Nr0 for the speed of rotation of the rotor. The additional visual information is presented, for example, in the form of an additional movable scale 17 that moves substantially horizontally in an additional window 18 relative to the other stationary reference marker 16.

The additional movable scale 17 has a central zone 19 of neutral color and with a central graduation 19a, and two zones 20 and 21 of different colors on both sides of said neutral central zone 19.

In the embodiment shown in FIGS. 10 and 11, the additional movable scale 17 is associated at least with information about the operating state of the engine unit(s). For example, when the aircraft has two engine units, this information is represented by a solid symbol and a hollow symbol 23 that are capable of moving along the additional window 18.

The solid symbol 22 is representative of the first engine unit and the hollow symbol is representative of the second engine unit. When both engine units are operating correctly, i.e. when they present an optimum speed of rotation at each engine outlet, the two symbols 22 and 23 are superposed and remain in a position that is in alignment with the central graduation 19a. Reference may be made for example to FIG. 11.

In contrast, in the event of malfunction of the first engine unit, the solid symbol 22 separates from the hollow symbol 23 and moves to the left in FIG. 10. Only the hollow symbol 23 remains in its position in alignment with the central graduation 19a, meaning that the second engine unit is transmitting the higher torque to the rotor. The speed of rotation at the outlet from the second engine unit remains optimum.

FIG. 11 shows operation in which there is no engine failure, but in which the desynchronization pitch has been exceeded, because of an increase in the real value Nr of the speed of rotation of the rotor, as displayed in the stationary window 15. The system is then in a desynchronized state. In this example, the real value Nr is expressed digitally as a percentage of the reference value Nr0 for the speed of rotation of the rotor.

The operation of the flight indicator is described below by means of a detailed description of the pilot assistance method of the invention.

By way of example, the pilot assistance method for assisting piloting of a rotary wing aircraft consists in using a flight indicator in association with a first-limit indicator FLI, acting by display means to present information on the display screen 5 relating to a parameter selected from the aircraft monitoring parameters, said selected parameter being the parameter having its real value that is the closest to the limit value defined for that parameter. First-limit instruments are known as such so their operation is not described in greater detail.

The pilot assistance method consists in using the real value Nr and the reference value Nr0 for the speed of rotation of a rotor and in using the movable scale 6a on the display screen 5 indicating the position of the collective pitch P.

The method is thus suitable for use on aircraft having at least two rotary wings, e.g. two contrarotating rotors.

The pilot assistance method consists in using a maximum limit value Nr+ and a minimum limit value Nr− for the speed of rotation of the rotor. These maximum and minimum limit values Nr+ and Nr− are set for a given aircraft, but the way they are transformed into limit positions Pinf and Psup for collective pitch may vary as a function of flight parameters or stages. Determining maximum and minimum limit values Nr+ and Nr− is, as such, in widespread use and known to the person skilled in the art for the purpose of defining characteristics of an aircraft, and it is therefore not further described in the present specification.

The pilot assistance method consists in converting the maximum limit value Nr+ and the minimum limit value Nr− in real time and as a function of physical flight parameters respectively into a bottom limit position Pinf and a top limit position Psup for the collective pitch. These limit positions Pinf and Psup are active and they move on the movable scale 6a as a function of variation in the physical flight parameters, and where appropriate of engine parameters.

The method in accordance with the invention also consists in determining the desynchronization pitch Pds and in displaying it on the movable scale 6a with the floating reference marker 9.

The pilot assistance method then consists in displaying the bottom and top limit positions Pinf and Psup on the movable scale 6a.

The pilot assistance method then consists in comparing in real time the real value and the reference value Nr and Nr0 for the speed of rotation of the rotor.

Following this comparison step, the pilot assistance method consists in displaying corrective information on the display screen 5 when a determined difference appears between the real value Nr and the reference value Nr0 for the speed of rotation of the rotor, the corrective information being at least visual and concerning the action to be taken by the pilot on the collective pitch adjustment in order to reestablish a good situation.

By way of example, the pilot assistance method consists in using corrective information of presentation that changes as the collective pitch approaches the bottom limit position Pinf or the top limit position Psup so as to attract the pilot's attention more.

Figure 2:
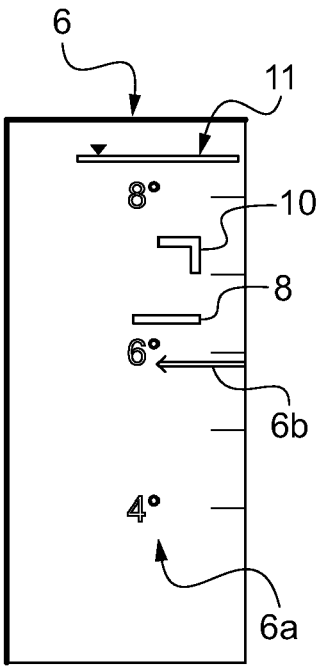
FIGS. 2 to 6 show an example of a flight indicator in accordance with the invention presenting the information returned to the pilot during different stages of operation of the aircraft.
Figure 3:
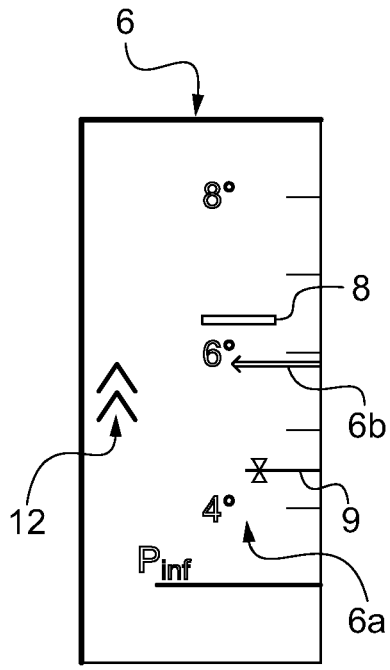

By way of example, FIG. 2 shows normal operation, whereas FIG. 3 shows a situation in which the first signal 12 appears informing the pilot that it is appropriate to increase the collective pitch in order to decrease the value of the real speed Nr of the rotor. By way of example, the first signal 12 is in the form of upwardly-directed chevrons of amber color.

Figure 4:
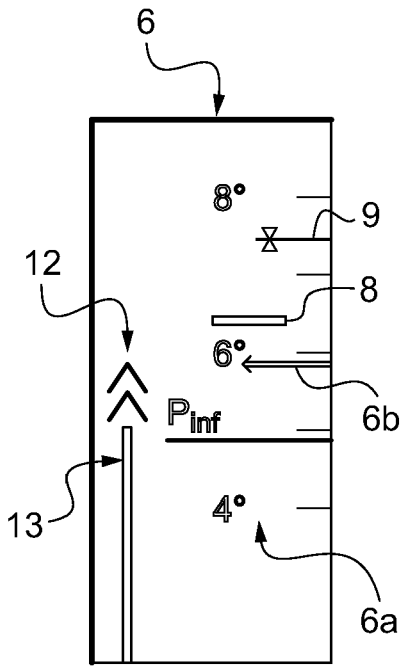

FIG. 4 shows the situation close to the limit position Pinf in which it is appropriate urgently to increase the collective pitch P in order to reduce the real value Nr of the speed of rotation of the rotor and avoid actually reaching the limit position Pinf. The first signal 12 is then accompanied with the second signal 13 which is in the form of a rising bar. The first signal 12 and the second signal 13 are then red in color to mark the urgency with which a corrective maneuver needs to be undertaken.

Figure 5:
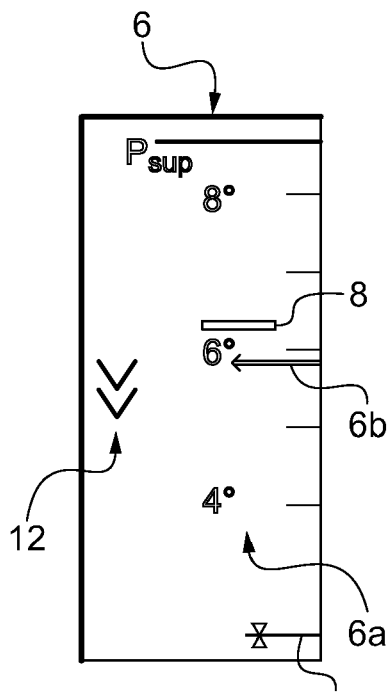
Figure 6:
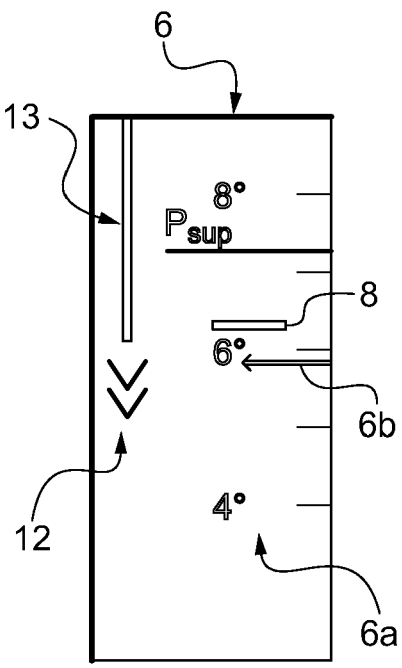

Similarly, FIGS. 5 and 6 show circumstances in which the top limit position Psup appears on the movable scale 6a, corresponding to a decrease in the real value Nr of the speed of rotation of the rotor. The first signal 12 is in the form of downwardly-directed chevrons of amber color in FIG. 5. The pilot thus reduces the collective pitch. In FIG. 6, the first signal 12 in the form of downwardly-directed chevrons is associated with the second signal 13 which is in the form of a downwardly-directed bar. The signals 12 and 13 are then both red in color indicating the urgency of a maneuver.

By way of example, the pilot assistance method consists in combining the visual corrective information made up of the first signal 12 and the second signal 13 with an audible warning if the maximum value Nr+ or the minimum value Nr− for the speed of rotation of the rotor is crossed. Such a crossing is displayed by the positions of the collective pitch limit Pinf or Psup of the movable scale 6a relative to the stationary reference 6b. The stationary reference 6b then crosses one or other of the limit positions Pinf or Psup.

Figure 1B:
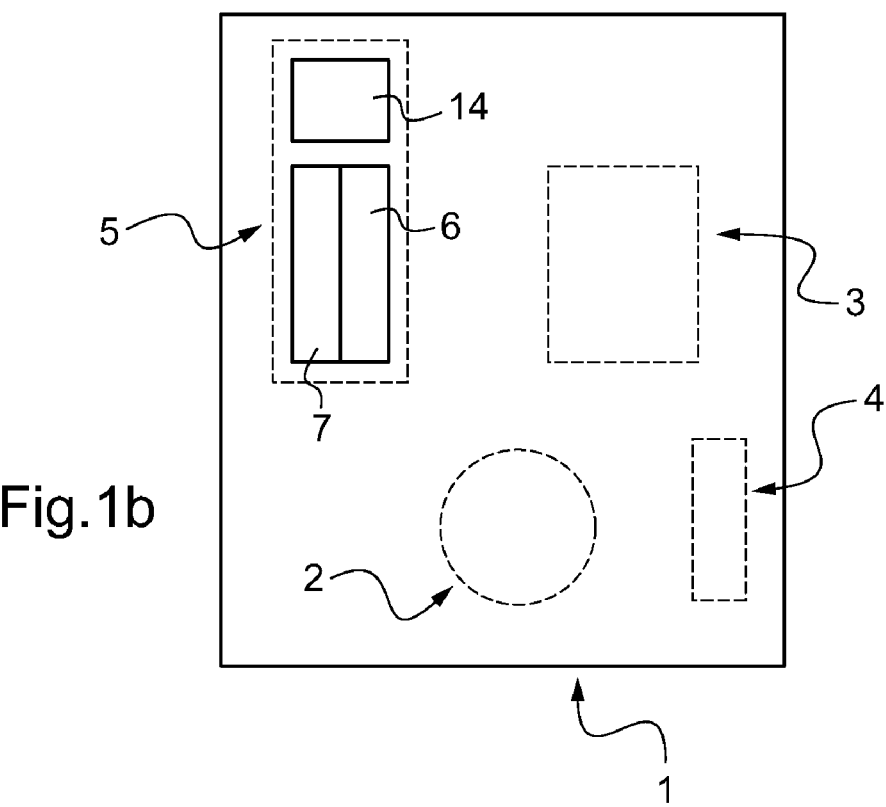
FIG. 1b is a diagram showing another element of a general screen for displaying information coming from various instruments of the aircraft and in particular another embodiment of a flight indicator in accordance with the invention.

In an implementation, shown generally in FIG. 1b, use is made of an additional dial 14 situated above the first dial 6.

By way of example, the pilot assistance method consists in displaying a digital value in the stationary window 15 of the additional dial 14 close to the movable scale 6a, which digital value corresponds to the real value Nr of the speed of rotation of the rotor.

The pilot assistance method then consists in associating the stationary window 15 in the additional dial 14 with an additional movable scale 17 that presents zones 20 and 21 of a different color together with a neutral central zone 19 corresponding to particular real values Nr for the speed of rotation of the rotor, and in moving said additional movable scale 17 so as to display the zone of corresponding color in register with the stationary window 15 constituting the other stationary reference marker 16.

The additional movable scale 17 moves substantially horizontally in the additional window 18 and has the central graduation 19a in the neutral central zone 19. The central graduation 19a is aligned with the stationary reference marker 16 when the real value Nr of the speed of rotation of the rotor is optimal.

When the real value Nr increases, as shown in FIGS. 8 and 9, the additional movable scale 17 moves and the stationary reference marker 16 points towards the zone 20 of amber color in FIG. 8 or towards the zone 21 of red color in FIG. 9, depending on circumstances.

By way of example, the pilot assistance method consists in using as physical flight parameters: measured values for temperature and altitude, forward speed values, and/or other vehicle parameters of the aircraft.

In an implementation, the pilot assistance method consists in using a computer, e.g. the computer of the first-limit indicator FLI, to determine in real time the top and bottom limit positions Psup and Pinf for the collective pitch P and also to determine the desynchronization pitch Pds.

Advantageously, the pilot assistance method may consist also in using data measured during flight testing in order to determine in particular by calculation and in real time the top and bottom limit positions Psup and Pinf for the collective pitch P and in order to determine the desynchronization pitch Pds.

In an implementation shown in FIGS. 10 and 11, when the aircraft has two engine units, the pilot assistance method consists, for example, in indicating the malfunction of one of the engine units at least visually on the additional movable scale 17.

The malfunction of one of the engine units is shown diagrammatically in FIG. 10, where the solid symbol 22 is offset to the left so as to be out of alignment with the central graduation 19a. The hollow symbol 23 representative of the second engine unit remains in alignment with the central graduation 19a, indicating that the operation of the second engine unit is unaffected and that it is the second unit that is transmitting the greater torque to the rotor. FIG. 10 thus corresponds to the presentation of the first dial 6 as shown in FIG. 2.

FIG. 11, in the context of the proper operation of both engine units shows an increase in the real value Nr of the speed of rotation of the rotor. This situation is thus similar to that shown in FIG. 3 where it is appropriate to increase the collective pitch P in order to return to an optimum state of operation.

By showing the limit positions Pinf and/or Psup for the collective pitch and also the desynchronization pitch by means of the floating reference marker 9, the first dial 6 serves to inform the pilot about the available maneuverability margin, e.g. for the purpose of performing or engaging stages of piloting in response to constraints, or engaging a stage of auto-rotation, for example.

Naturally, the present invention may be subjected to numerous variants as to its implementation. Although several embodiments and implementations are described, it will readily be understood that it is not conceivable to identify exhaustively all possible implementations or embodiments. It is naturally possible to replace any of the means described or any of the steps described by equivalent means or by an equivalent step without going beyond the ambit of the present invention.

What is claimed is:

1. A pilot assistance method for assisting the piloting of a rotary wing aircraft, the method comprising the steps of using a real value Nr and a reference value Nr0 for a speed of rotation of at least one rotor and using display means to present on a display screen (5) a movable scale (6a) for indicating collective pitch position P, the method further comprising:

using a maximum limit value Nr+ and a minimum limit value Nr− for rotor rotation speed;

determining using a processor a desynchronization pitch Pds corresponding to the position of the collective pitch P from which transmission of mechanical torque from a turbine engine unit and a main gearbox is interrupted;

displaying the desynchronization pitch Pds on the movable scale (6a) by using a floating reference marker (9);

translating in real time and as a function of physical flight parameters, the maximum limit value Nr+ and the minimum limit value Nr− respectively into a bottom limit position Pinf and a top limit position Psup for the collective pitch P, said limit positions Pinf and Psup being active;

displaying the bottom and top limit positions Pinf and Psup on the movable scale (6a);

comparing in real time the real value Nr of the speed of rotation of the rotor with the reference value Nr0 for the speed of rotation of the rotor; and when a determined difference appears between the real value Nr and the reference value Nr0 for the speed of rotation of the rotor, displaying at least one item of corrective information on the display screen (5), said information being at least visual and concerning action to be undertaken by the pilot on adjustment of the collective pitch P.

2. A pilot assistance method according to claim 1, further comprising using corrective information of presentation that changes when the position of the collective pitch P approaches the bottom limit position Pinf or the top limit position Psup in order to attract the pilot's attention more strongly.

3. A pilot assistance method according to claim 2, further comprising combining the visual corrective information with an audible warning in the event of the real value Nr crossing the maximum limit value Nr+ or the minimum limit value Nr− for the speed of rotation of the rotor.

4. A pilot assistance method according to claim 1, further comprising determining the desynchronization pitch by means of an algorithm involving theoretical data and/or data measured during flight testing.

5. A pilot assistance method according to claim 1, further comprising using a first-limit indicator FLI, using display means to present information on the display screen (5), said information relating to at least one monitoring parameter of the aircraft, for which the real value is closest to the limit value defined for said parameter, and further displaying the movable scale (6a) on said display screen (5).

6. A pilot assistance method according to claim 1, further comprising using an additional dial (14) to display a digital value in a stationary window (15) in the vicinity of the movable scale (6a), the digital value corresponding to a real value Nr of the speed of rotation of the rotor.

7. A pilot assistance method according to claim 6, further comprising associating an additional movable scale (17) with the stationary window (15), which additional movable scale presents zones (20, 21) of different colors together with a neutral central zone (19) including a central graduation (19a), said zones corresponding to real values Nr of the speed of rotation of the rotor, and in moving said additional movable scale (17) to display the colored zones (19, 20, 21) including the real value Nr in register with the stationary window (15) constituting another stationary reference marker (16).

8. A pilot assistance method according to claim 1, further comprising using as physical flight parameters, in particular measured values of temperature and altitude, speed of advance values, and/or values of other vehicle parameters of the aircraft.

9. A pilot assistance method according to claim 5, further comprising using a computer of the first-limit indicator FLI to act in real time to determine the top and bottom limit positions Psup and Pinf for the collective pitch and also the desynchronization pitch Pds.

10. A pilot assistance method according to claim 5, further comprising using a computer independent of the first-limit indicator FLI to determine in real time the top and bottom limit positions Psup and Pinf of the collective pitch P and also the desynchronization pitch Pds.

11. A pilot assistance method according to claim 1, further comprising using data measured during flight testing to determine in real time the top and bottom limit positions Psup and Pinf for the collective pitch P.

12. A pilot assistance method according to claim 6, wherein, when the aircraft has at least two engine units, the method further includes indicating a malfunction of one of the engine units at least visually on the additional dial (14) in the vicinity of the additional movable scale (17).

13. An aircraft flight indicator system including sensors suitable for delivering information relating to various monitoring parameters of the aircraft, a processor for processing said information, and a display for presenting information on a display screen (5), wherein the indicator system comprises:
   a screen that is movable relative to a stationary reference marker (6b) on the display screen (5), the scale indicating a position of the collective pitch P;
   an additional processor for processing in real time predetermined maximum and minimum limit values Nr+ and Nr− for the speed of rotation of the rotor respectively in bottom and top limit positions Pinf and Psup for the collective pitch P, said limit positions Pinf and Psup being active;
   said additional processor serving to determine the desynchronization pitch Pds corresponding to a position of the collective pitch beyond which transmission of mechanical torque between the turbine engine unit and the main gearbox is interrupted;
   a display for displaying in real time the bottom and top limit positions Pinf and Psup together with the desynchronization pitch Pds on the movable scale (6a);
   the additional processor including a comparator for comparing in real time a real value Nr with a reference value Nr0 for speed of rotation of the rotor; and
   the additional processor also including an activator for activating the display to display corrective information on the display screen (5) as a function of a result of a difference between the real value Nr and the reference value Nr0 for a speed of rotation of the rotor, the corrective information being at least visual and concerning an action to be taken on the collective pitch.

14. A flight indicator system according to claim 13, wherein the processor, the additional processor, the display, and the activator are controlled by a computer of a first-limit indicator FLI.

15. A flight indicator system according to claim 13, wherein the additional processor and the activator are controlled by a computer distinct from the computer in communication with a first-limit indicator FLI.

16. A flight indicator system according to claim 14, wherein the computer includes software resources for determining by calculation firstly the top and bottom limit positions Psup and Pinf for the collective pitch P, and secondly the desynchronization pitch Pds.

17. A flight indicator system according to claim 14, wherein the computer also includes a memory having stored therein predetermined data together with flight test data, said data being used in calculations.

18. A flight indicator system according to claim 13, wherein the display screen (5) includes two juxtaposed dials (6, 7), one of the dials (7) being used for a first-limit indicator (FLI) and the other dial (6) being used in particular to display the movable scale (6a) indicating the pitch limit positions and the desynchronization pitch.

19. A flight indicator system according to claim 13, wherein the display screen (5) has a single dial used for a first-limit indicator FLI and for displaying the movable scale (6a) indicating pitch limit positions and desynchronization pitch.

20. A flight indicator system according to claim 13, including an additional dial (14) indicating: a real value Nr of the speed of rotation of the rotor in a stationary window (15) that also constitutes another stationary reference marker (16); at least one item of additional visual information concerning the difference between the real value Nr and the reference value Nr0 of the speed of rotation of the rotor; and/or at least one item of information concerning state(s) of operation of engine unit(s).

* * * * *